W. E. CHIPMAN.
KNITTING MACHINE.
APPLICATION FILED NOV. 2, 1910.
1,163,970.
Patented Dec. 14, 1915.
12 SHEETS—SHEET 6.
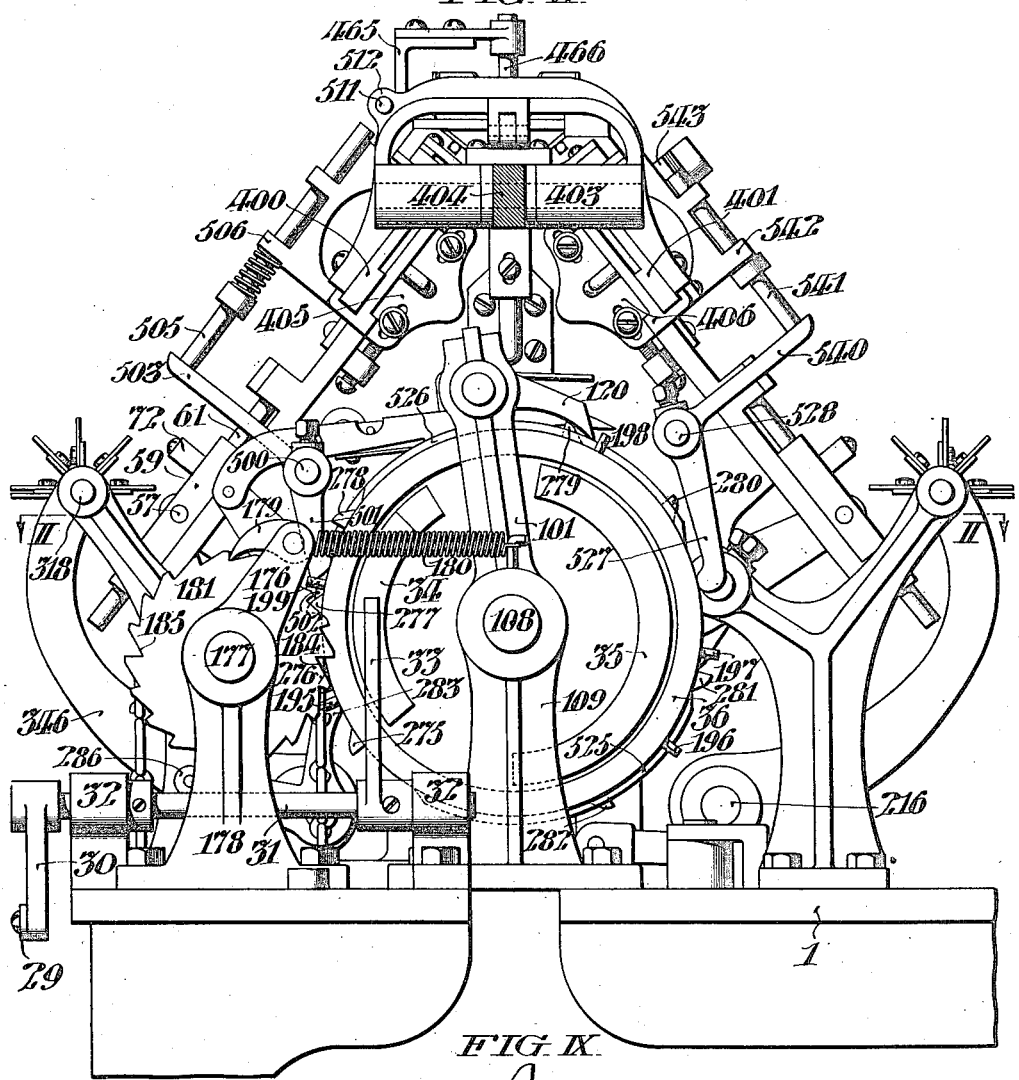
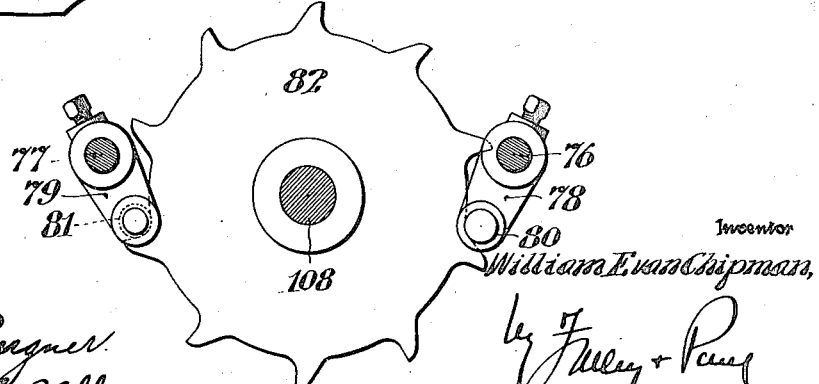

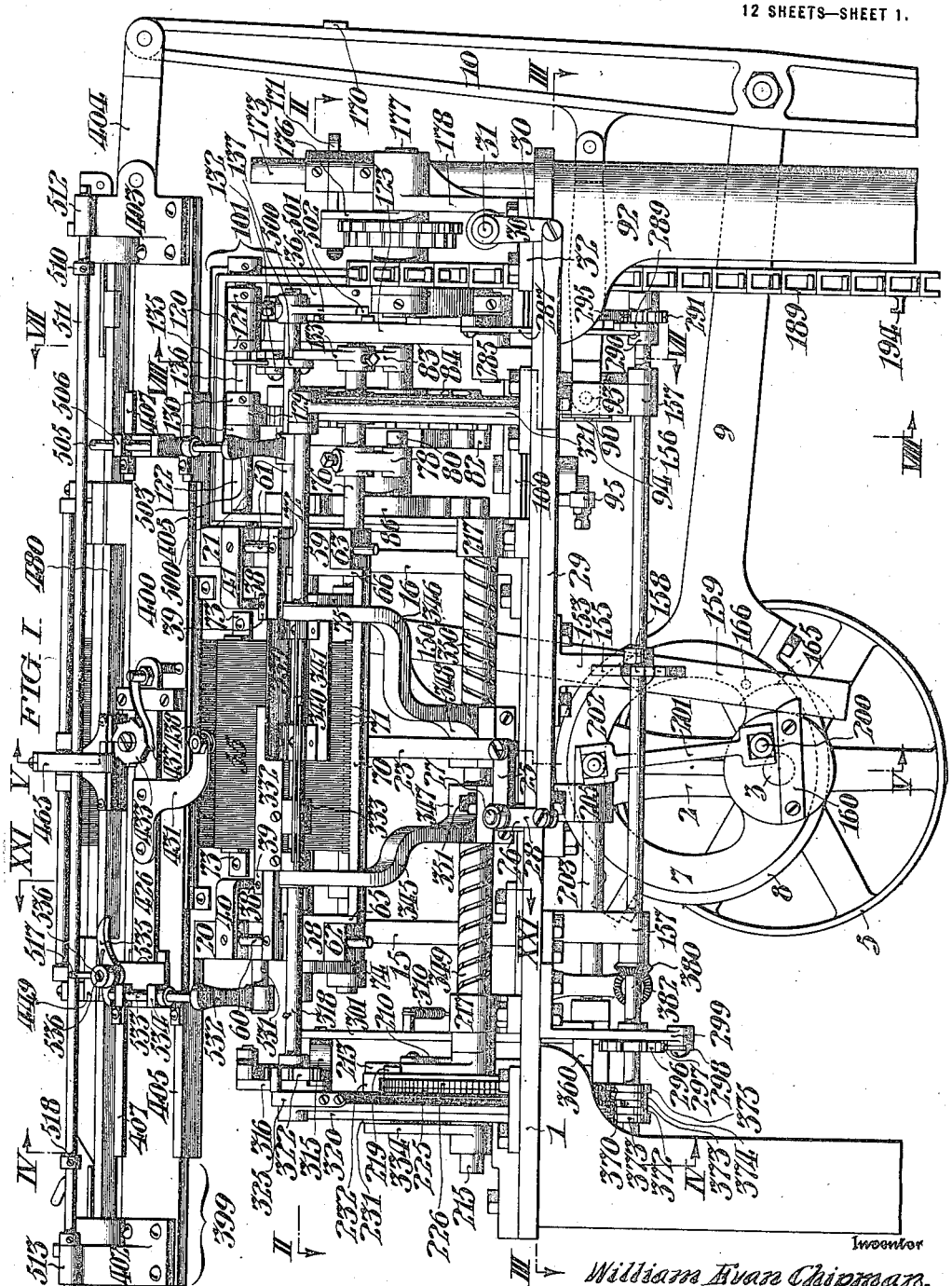

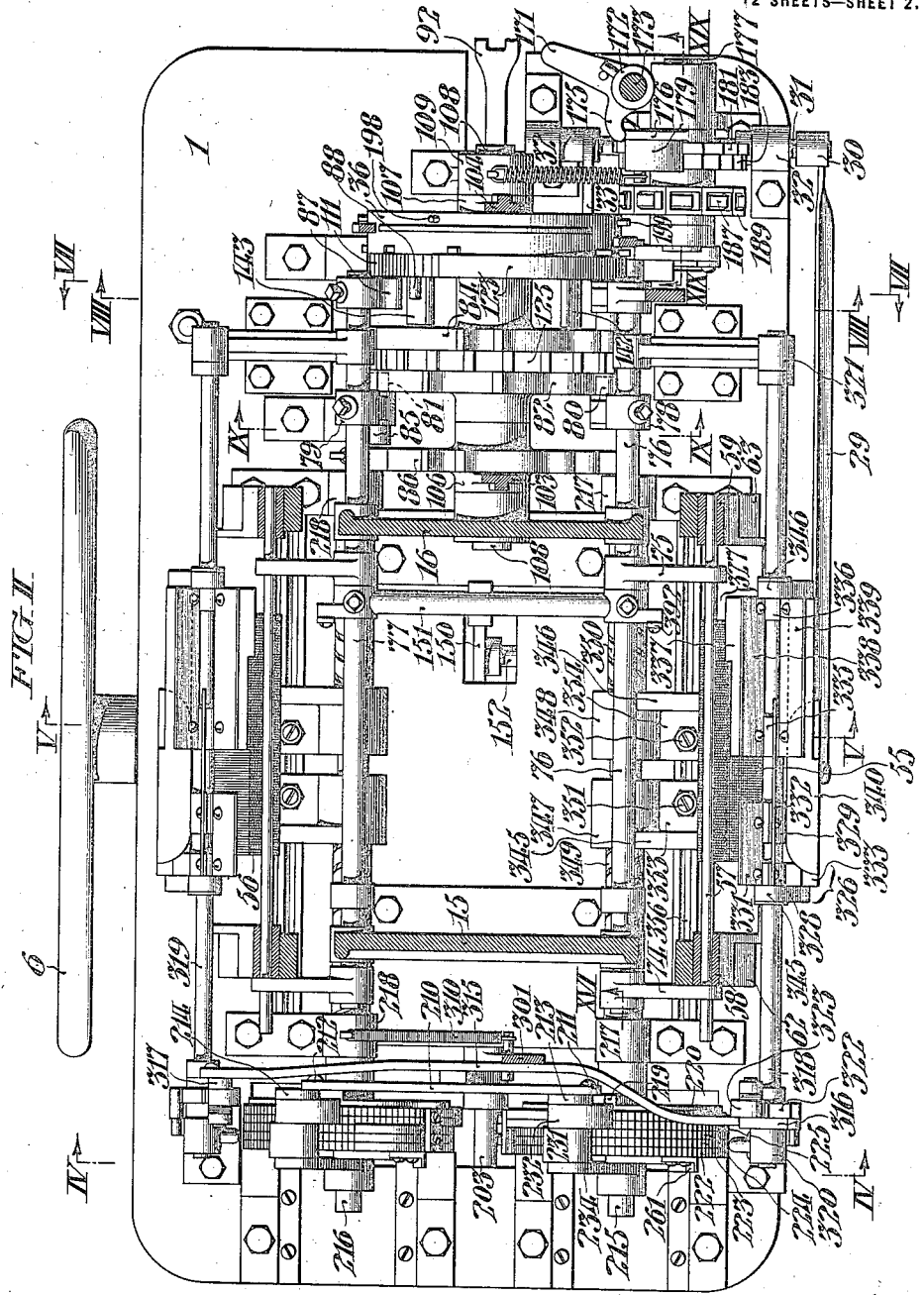

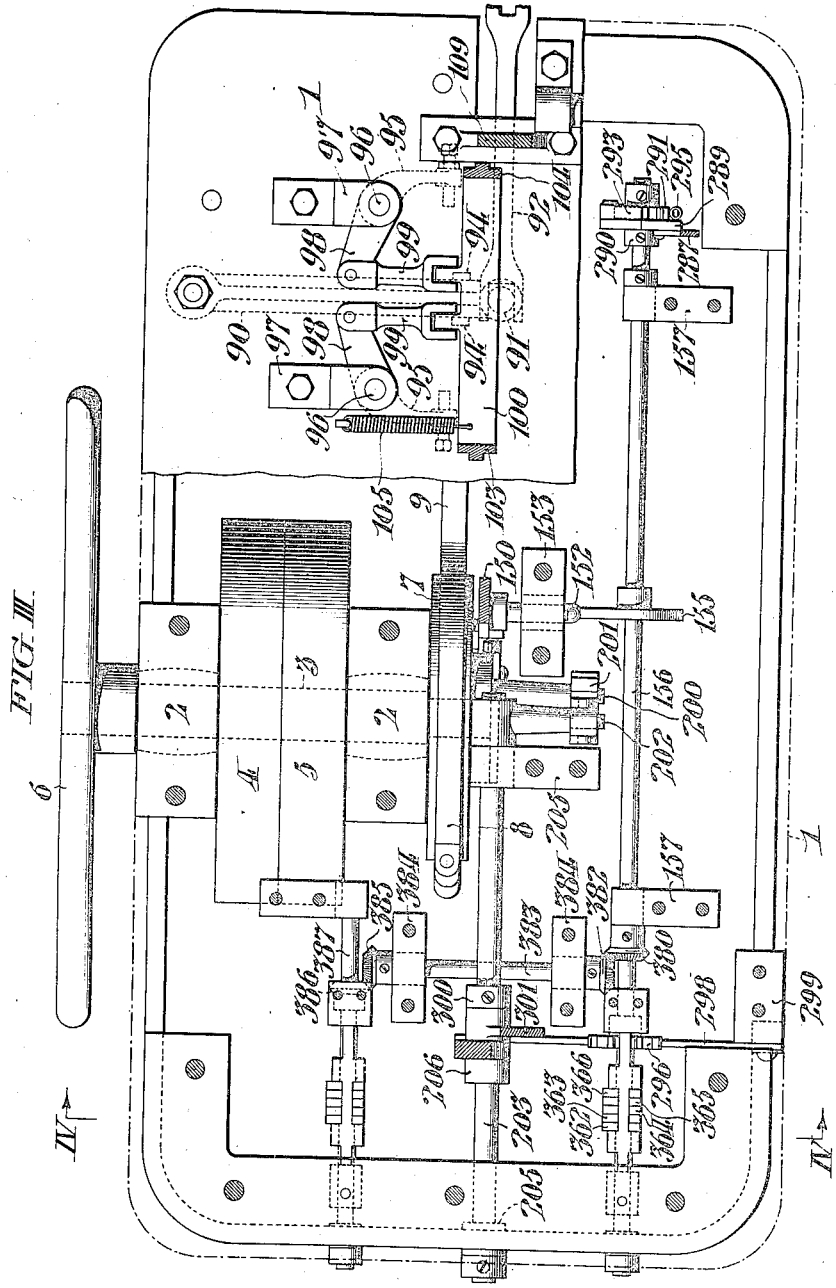

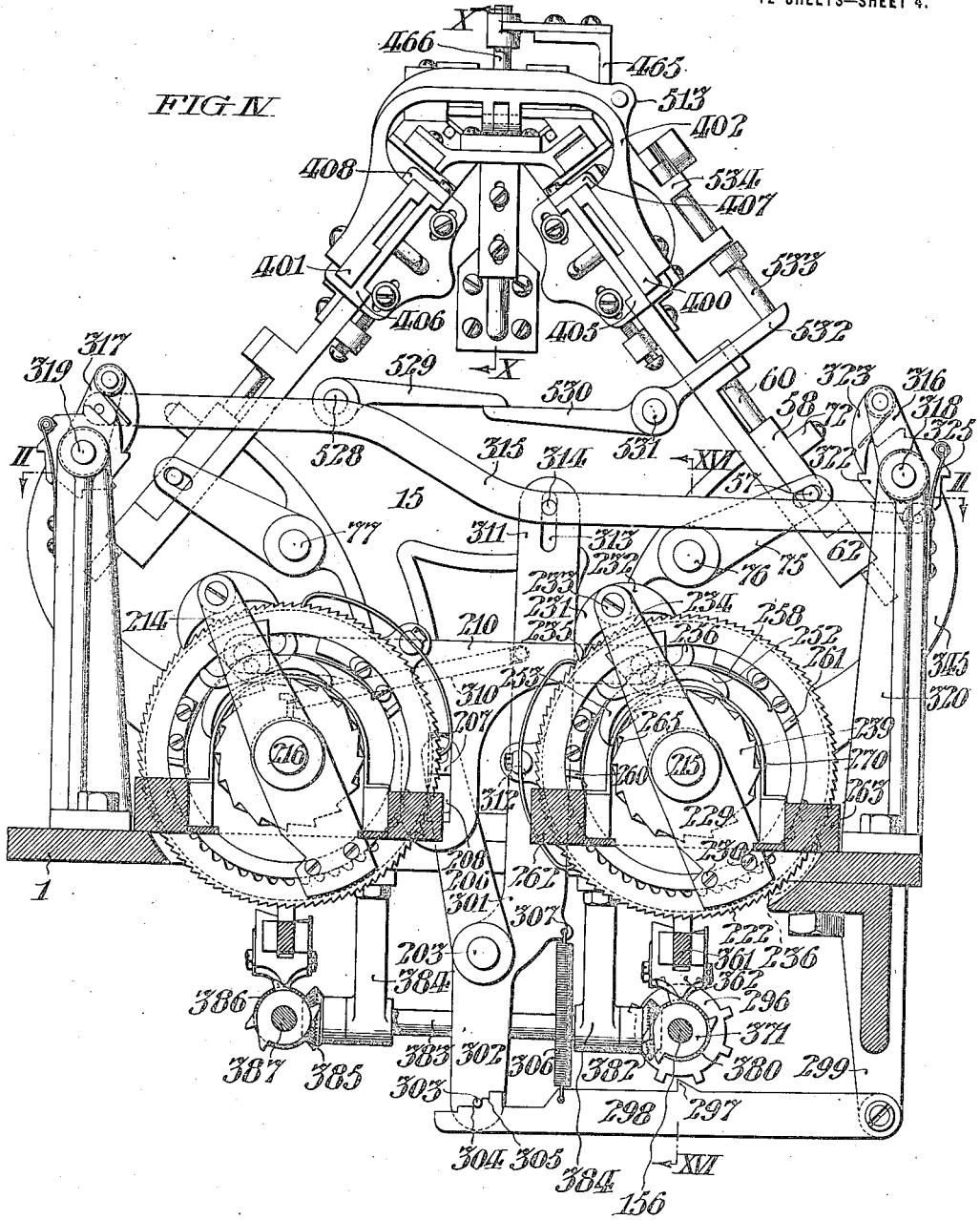

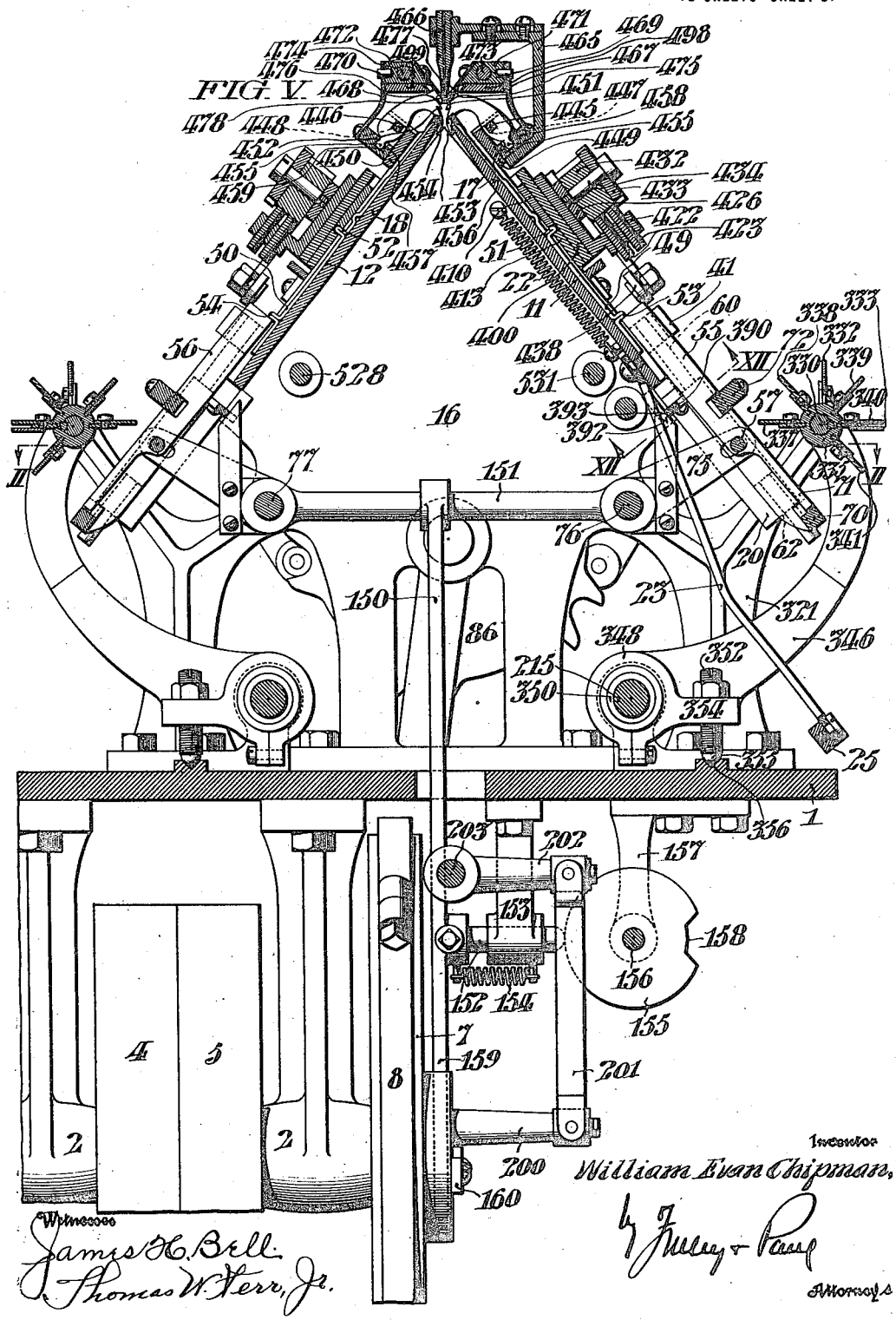

W. E. CHIPMAN.
KNITTING MACHINE.
APPLICATION FILED NOV. 2, 1910.
1,163,970.
Patented Dec. 14, 1915.
12 SHEETS—SHEET 7.
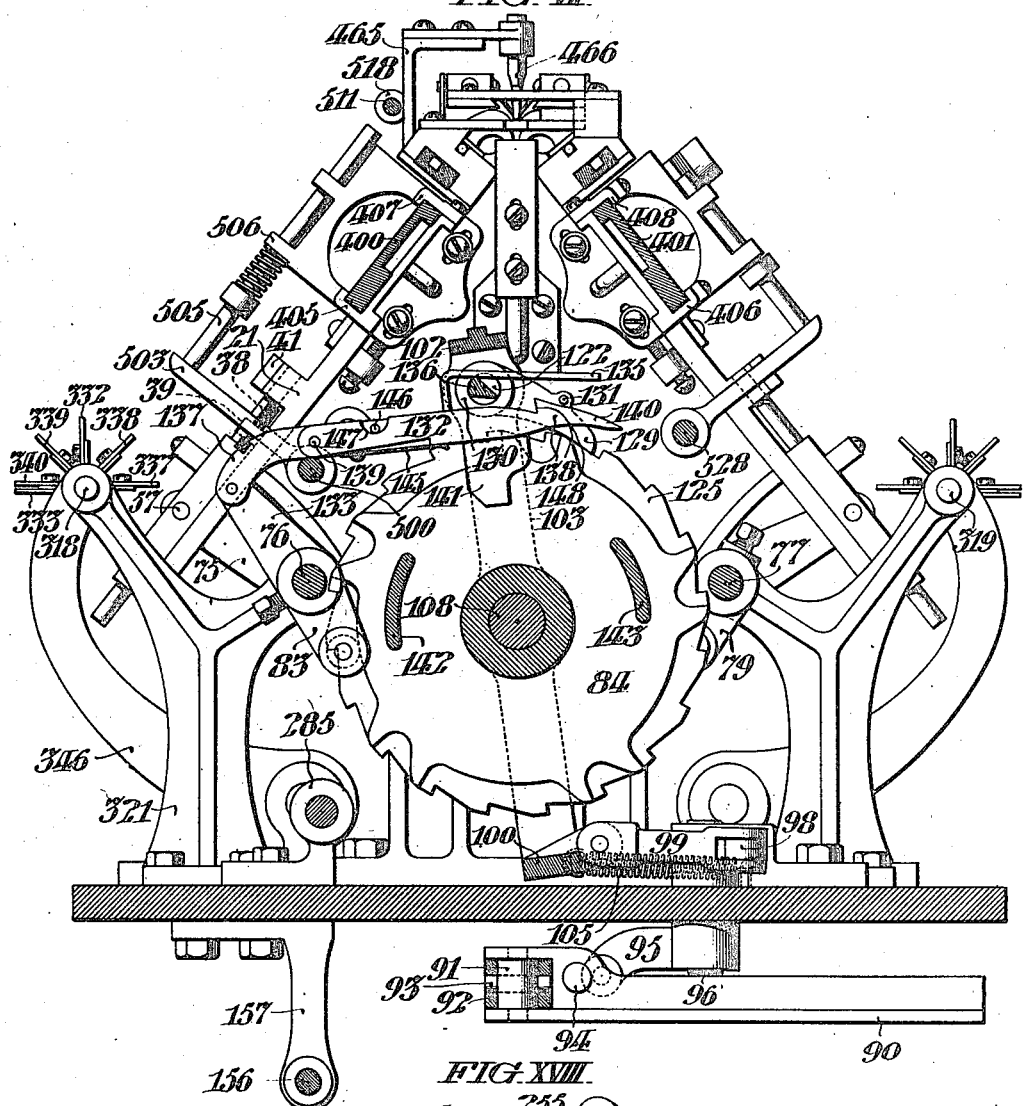
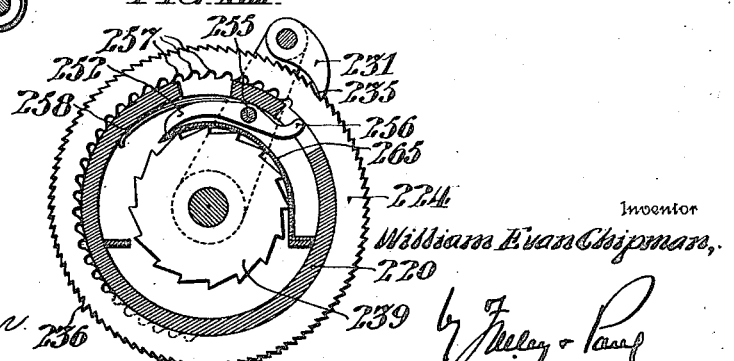
Witnesses
John C. Bergner
James H. Bell
Inventor
William Evan Chipman,
by Seeley & Paul
Attorneys W. E. CHIPMAN.
KNITTING MACHINE.
APPLICATION FILED NOV. 2, 1910.
1,163,970.
Patented Dec. 14, 1915.
12 SHEETS—SHEET 8.
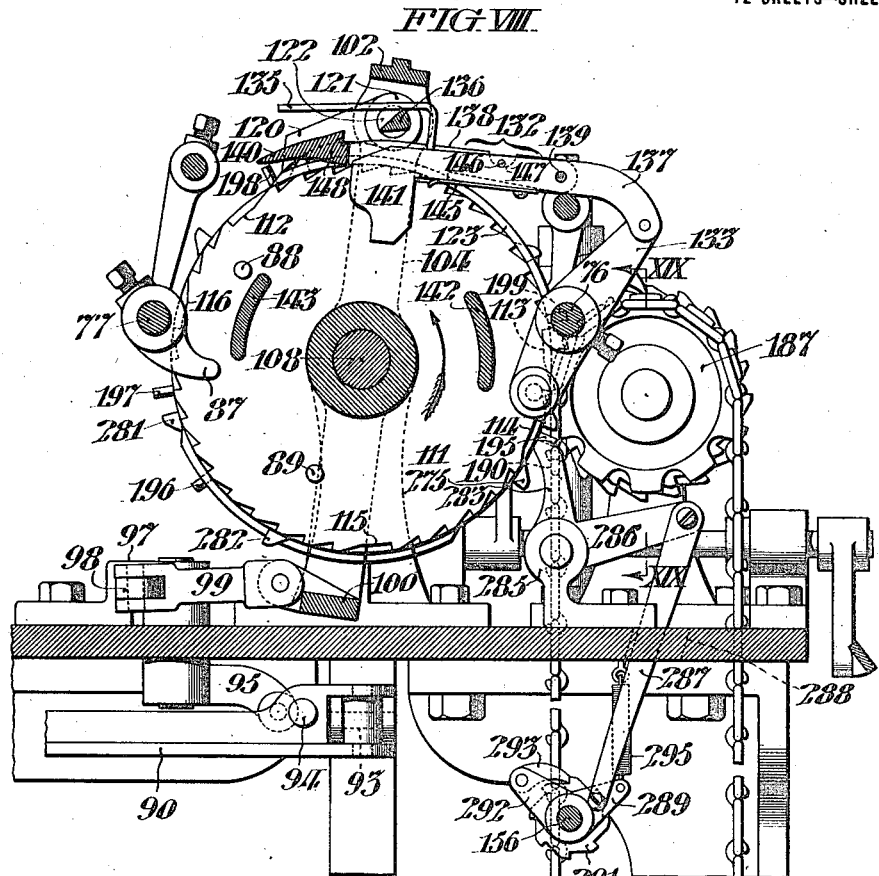
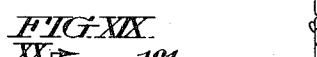
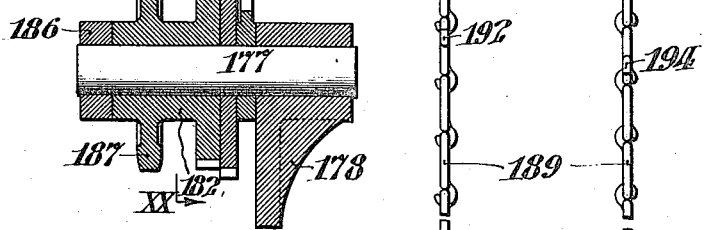
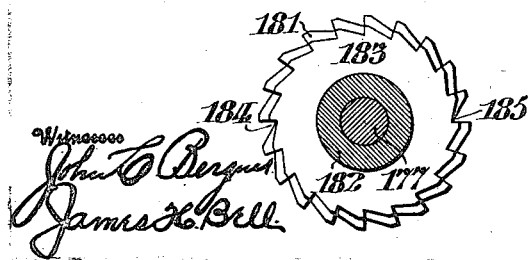

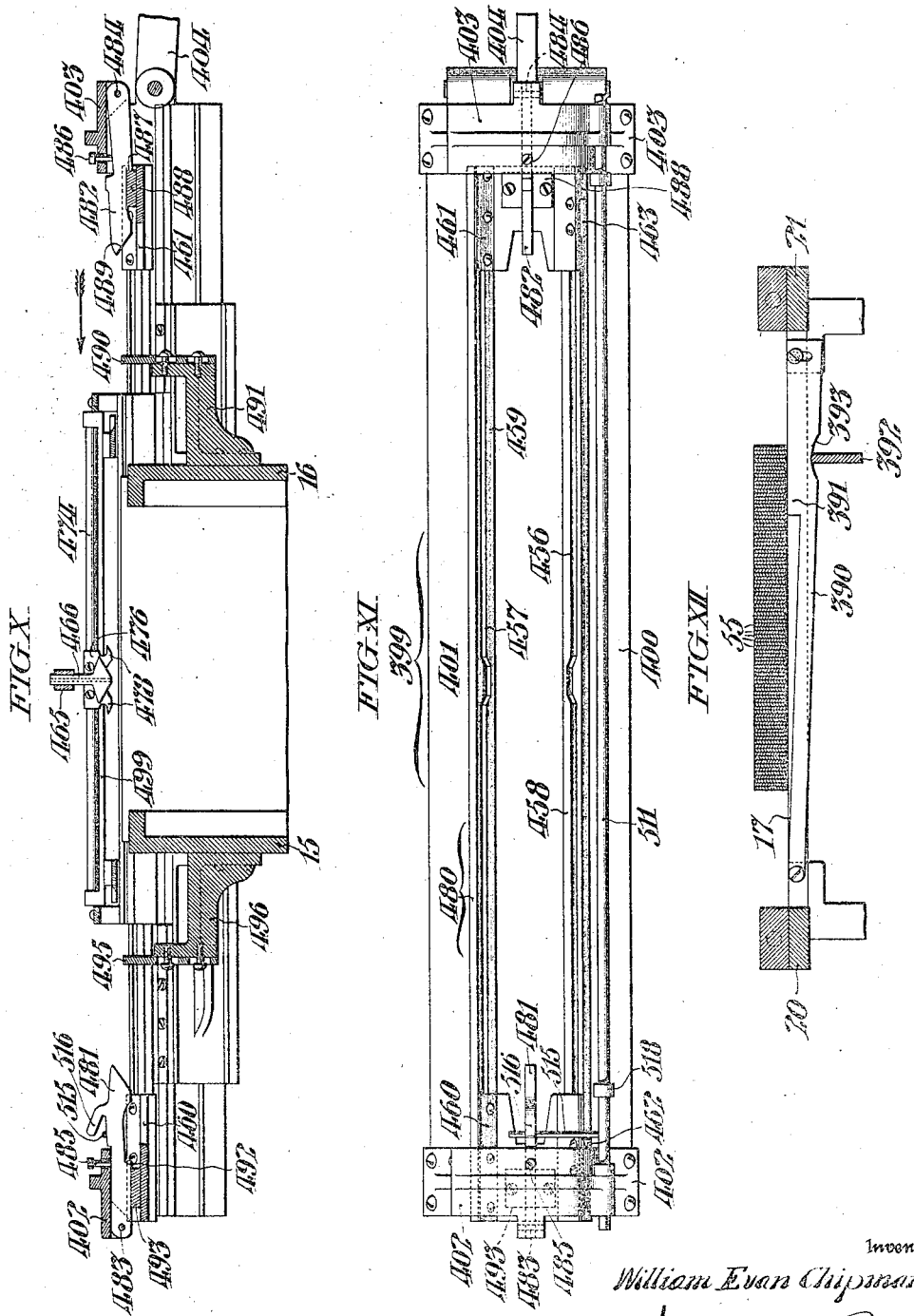

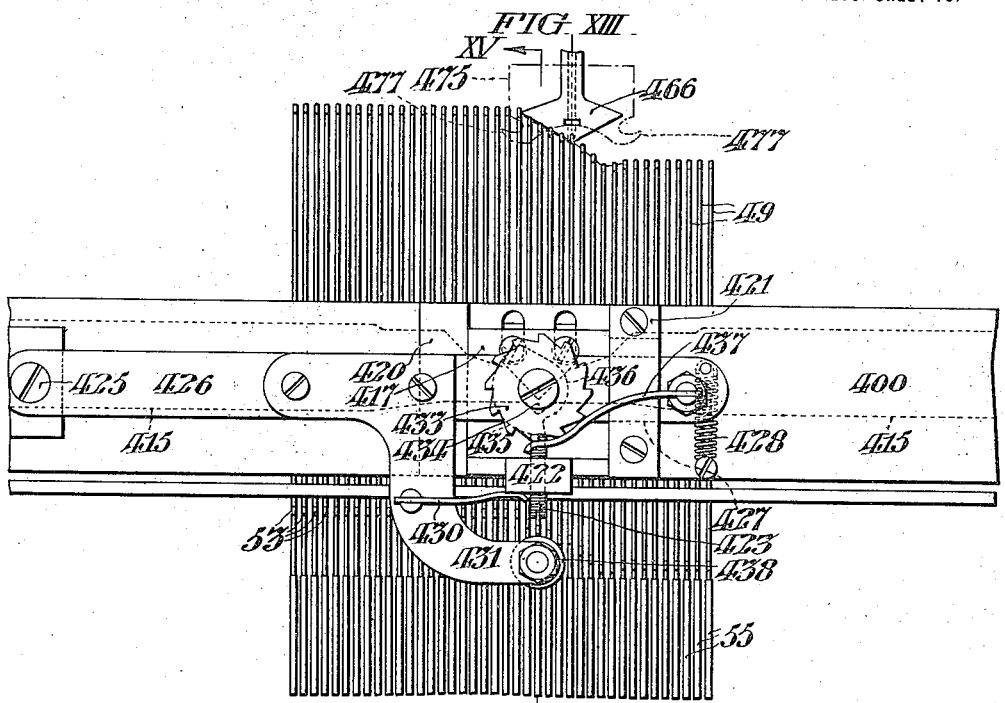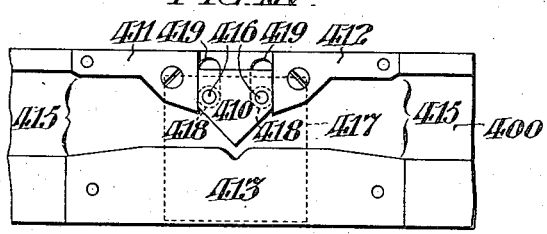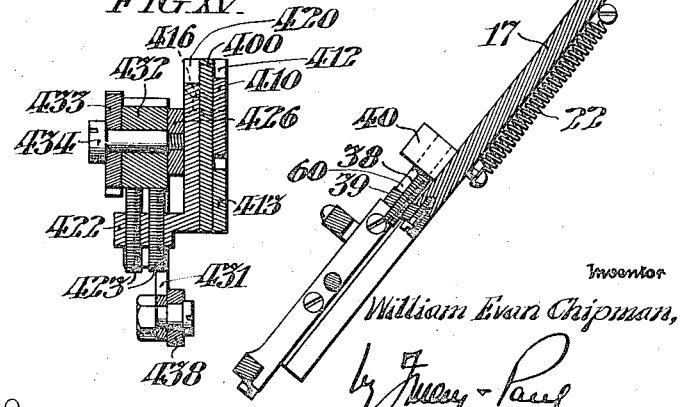

W. E. CHIPMAN.
KNITTING MACHINE.
APPLICATION FILED NOV. 2, 1910.
1,163,970.
Patented Dec. 14, 1915.
12 SHEETS—SHEET 11.
FIG. XVI.
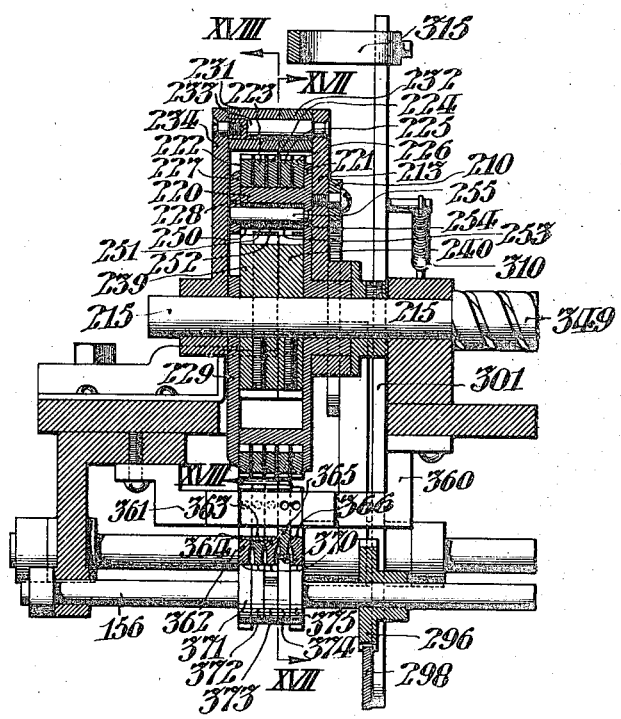
FIG. XVII.
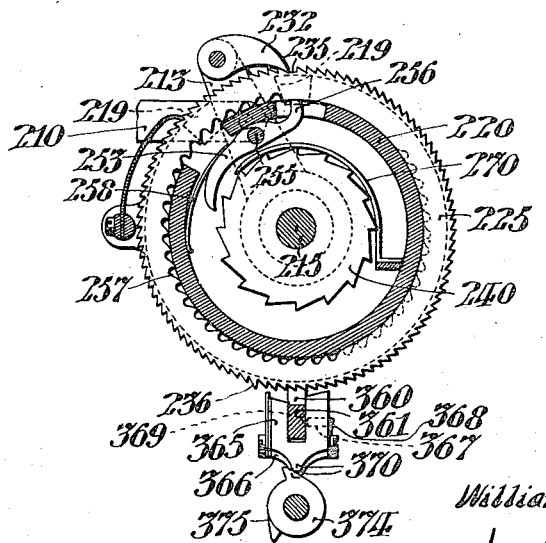
Inventor
William Evan Chipman,

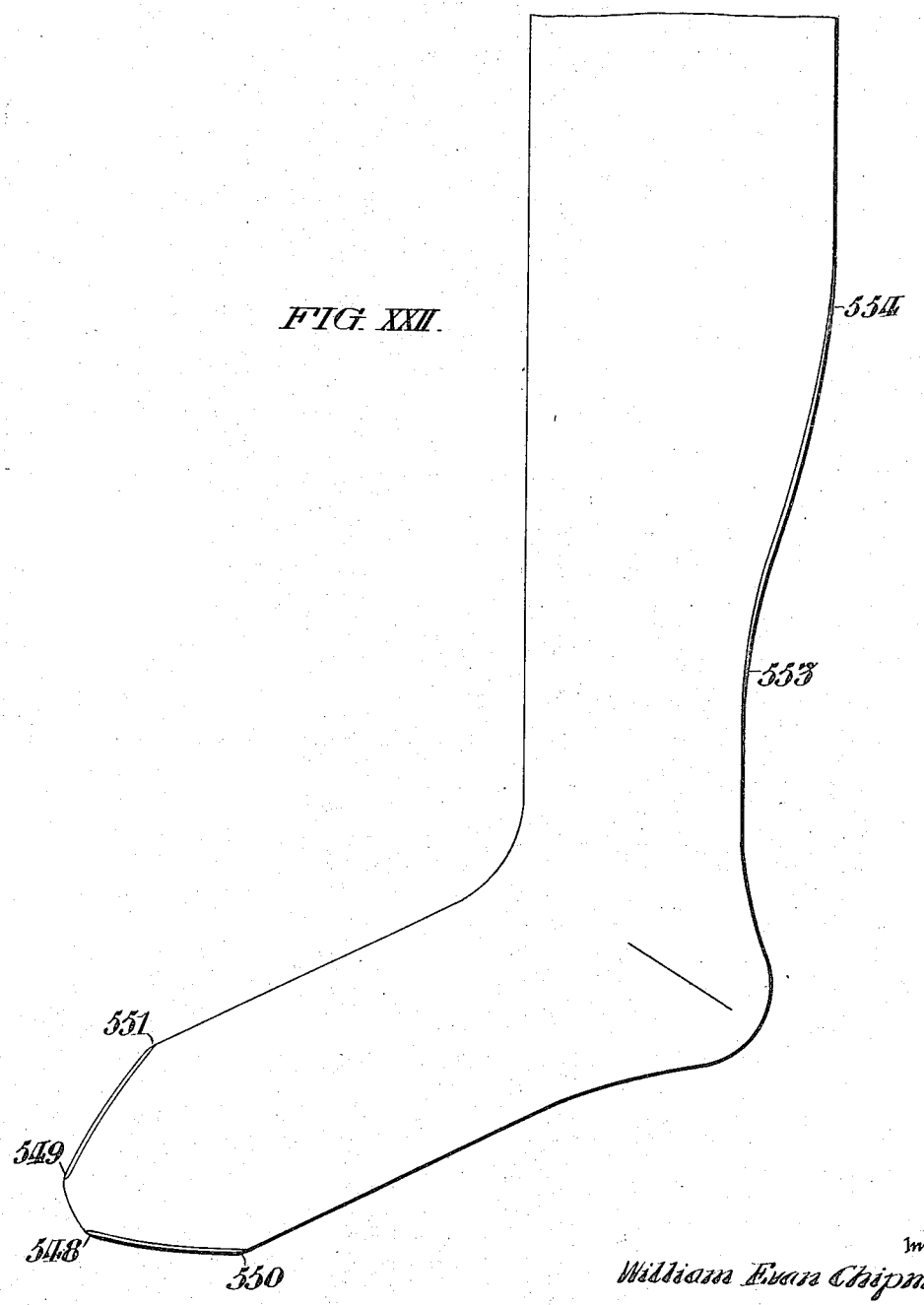

UNITED STATES PATENT OFFICE.

WILLIAM EVAN CHIPMAN, OF EASTON, PENNSYLVANIA.

KNITTING-MACHINE.

1,163,970. Specification of Letters Patent. Patented Dec. 14, 1915.

Application filed November 2, 1910. Serial No. 590,343.

*To all whom it may concern:*

Be it known that I, WILLIAM EVAN CHIPMAN, of Easton, in the county of Northampton and State of Pennsylvania, have invented certain new and useful Improvements in Knitting-Machines, whereof the following is a specification, reference being had to the accompanying drawings.

The invention relates to new and useful improvements in knitting machines, and more especially to straight knitting machines wherein two straight rows of inclined needles are used in knitting a tube which may be fashioned to form a stocking.

Where tubular fabrics are knit on a machine of the above character, and the tube is widened by bringing into action one or more needles, holes are formed in the fabric at the widened portion, which makes an objectionable stocking. In order to overcome this objection, and to strengthen the stocking at the widened portion, an object of the present invention is to provide mechanism for knitting a strengthening gore which may be joined with the stitches that are united to form the widened portions of the stocking.

A further object of the invention is to provide a knitting machine of the above character with cam wheels for raising and lowering the needles, which cam wheels are controlled by a change cam which in turn is controlled by a pattern chain.

A further object of the invention is to provide a machine of the above character with individual jacks for raising the needles, and stitch cams for depressing the needles to form the stitches.

A further object of the invention is to provide fashioning plates for controlling the jacks, which raise and lower the needles, which fashioning plates operate during the formation of the toe and the heel and the widened portion of the leg of the stocking.

These and other objects will in part be obvious, and will in part be hereinafter more fully described.

In the accompanying drawings Figure I, is a side elevation of a fashioning knitting machine conveniently illustrating my improvements. Fig. II, is a sectional view on line II, II, in Fig. I. Fig. III, is a similar view on a lower plane, as indicated at III, III, in Fig. I. Fig. IV, is a vertical cross sectional view taken on the line IV, IV, of Figs. I and II. Fig. V, is a staggered central cross section indicated at V, V, in Figs. I and II. Fig. VI, shows an end elevation of the machine, looking from the right in Figs. I and II. Fig. VII, is a vertical cross section, indicated by line VII, VII, in Figs. I and II. Fig. VIII, is a similar view, looking in the opposite direction, as shown at VIII, VIII, in Figs. I and II. Fig. IX, is a detail cross section on line IX, IX, in Fig. II. Fig. X, illustrates a fragmentary longitudinal section through the upper portion of the machine, as shown by the arrows X, X, in Fig. IV. Fig. XI, is a plan view, showing the relative positions of the needle cam bars and the sinker cam bars. Fig. XII, is a detail sectional view on line XII, XII, in Fig. V. Fig. XIII, shows in detail one of the actuating mechanisms for the stitch cams. Fig. XIV, is a fragmentary elevation of the inner face of one of the needle cam bars at the stitch-forming point. Fig. XV, is a cross section through the needle cam bar, as indicated at XV, XV, in Fig. XIII. Fig. XVI, shows a detail cross section of one of the mechanisms which control the variation of the number of needles during fashioning; this view is indicated at XVI, XVI, in Figs. II and IV. Figs. XVII and XVIII, are vertical sectional views taken on lines XVII, XVII, and XVIII, XVIII, in Fig. XVI, respectively. Fig. XIX, is a detail sectional view on the line XIX, XIX, of Fig. VIII. Fig. XX, is a cross section on line XX, XX, of Fig. XIX. Fig. XXI, is a detail sectional view taken on the line XXI, XXI, in Fig. I, showing one of the screws for limiting the movement of the needle bed, and the spring tending to raise the said bed. Fig. XXII, is a diagrammatic view, showing the stocking knit according to my invention.

In carrying out my invention, I have provided a framework on which is mounted two needle beds, each of which is provided with a straight row of needles. The needles are raised by individual jacks, and are lowered by stitch cams which reciprocate back and forth across the needle beds. The individual jacks are in turn controlled by pattern mechanism so they may be raised to render the jacks ineffective. Each of the sets of jacks is raised and lowered by rock shafts, which are controlled by cam wheels, and these cam wheels are in turn controlled by a change drum that is rendered effective or ineffective by a pattern chain. This mechanism is preferably intended for knitting a stocking beginning at the toe of the stocking and finishing at the top thereof. In the knitting of the stocking, the needles on both the needle beds are raised and the thread laid into the hooks of the needles, after which the needles on one bed remain idle while a plurality of courses are knitted on the other bed. Then sufficient needles for the beginning of the toe are thrown into action on both beds, and the toe of the stocking knitted and widened and the widening stitches joined with the subsequently knitted courses, which form a strengthening gore for the widened portion of the toe. After the knitting of the toe of the stocking, the foot portion thereof is knit in the usual way. The manner of knitting the heel of the stocking will be described in detail later on. A strengthening gore is knit for the widening portion in the leg of the stocking, in a manner similar to that of the widened portion of the toe.

Taking up the description more in detail, the machine will be described under different headings, for the sake of clearness.

*I. The driving mechanism.*—In the figures 1, represents the bed plate of the machine, mounted upon suitable legs or standards, and to which are bolted the depending bearing brackets 2, 2, wherein is journaled the main or driving shaft 3. The said shaft 3, carries the usual tight and loose pulley 4, and 5, respectively, and on its other end a hand wheel 6. Secured to the inner end of said shaft is an eccentric 7, having a strap 8, whose rod 9, is pivoted at its outer end to a vertical rocker arm 10, which imparts reciprocatory motion to the thread carrier and to various other parts of the machine. The said rocker arm 10, is fulcrumed at its lower end to the framework of the machine at a point not illustrated in the drawings.

*II. The needle beds.*—According to my invention, the needles are equally divided and located on opposite sides of the machine, as at 11, and 12, in suitable needle beds. In the motion of the machine in one direction, the needles knit on one side of the machine, and in the return stroke, the needles upon the opposite side become active. In this manner a complete course is knit, upon a tube, and each reciprocation or movement back and forth of the machine corresponds exactly to a rotation of a circular machine. In other words, each set of needles knits a flat web, and each of the flat webs is fashioned and united at the region of the end needles of the two series.

As the needle beds are identical in many respects, it will be only necessary to describe one of them, designating only such of the common parts on the other side as are deemed absolutely necessary to the clear understanding of the operation. For convenience, the side to the right of Figs. IV and V, or that illustrated in Fig. I will be described in detail.

Bolted to the top of the bed plate 1, are standards 15, and 16, which are inclined toward their tops and support the needle bed plates 17 and 18 as best shown in Fig. V. The bed plate 18 is rigidly secured to the standards 15, and 16, but the bed plate 17, is capable of a slight longitudinal motion, so that the needles may be raised and their knitting position brought closer to the other needles. The said plate 17, is mounted between guides 20, and 21, which are respectively secured to the standards 15, and 16, as best shown in Fig. I. Plate 17, is subject to the pull of tension springs 22, which tend to keep it in its upper position. Secured to the back of the said plate 17, is a link 23, whose other end is pivotally connected to one arm 25, of a bell crank lever 26, which is fulcrumed upon a stud 27, on the top of the bed plate 1. The other arm 28, of the bell crank lever 26, is connected by means of a link 29, to the outer end of an arm 30, mounted upon a counter shaft 31, at the right hand end of the machine, as seen in Fig. I. Shaft 31, is journaled in brackets 32, bolted to the top of the bed plate, and carries near its inner end a cam finger 33, which is adapted to be engaged by cams 34, and 35, on the side of a rotatable drum 36, see Fig. VI. The springs 22, already mentioned, which exert their influence upon the needle bed plate 17, also serve to maintain the cam finger 33, in engagement with its cams 34 and 35. When the drum 36, is rotated and the finger 33, allowed to drop into the gaps between its cams 34, and 35, the needle bed is then pulled up by its springs 22, as will be readily understood. The amount of motion of the needle bed 17, is, however, limited by means of adjustable set screws 38, which are mounted in lugs 39, projecting laterally from the bottom edge of the said bed, and which engage extensions 40, and 41, secured to the guides 20, and 21, respectively, (see Figs. I and XXI).

*III. Mechanism for the independent control of needles.*—Bed plates 17, and 18, as best shown in Fig. V, are provided with the usual grooves for the guidance of their respective needles 49, and 50, having upper butts 51, and 52, which are adapted to be engaged by the knitting cams, and lower butts 53, and 54, which are adapted to be engaged by individual jacks or fingers and thereby raised to the knitting level. Each of the series of needles 49, and 50, is controlled by a series of jacks 55, and 56, respectively, which correspond in number to the needles, and are likewise equally divided on each side of the machine. Jacks 55, corresponding to needles 49, are fulcrumed upon a rod 57, which is mounted in slide blocks 58, and 59, moving upon suitable guides 60, and 61, which are respectively secured in lugs 62, and 63, projecting from the guides 20, and 21, previously mentioned. See Figs. I and V. Slide blocks 58, and 59, are provided with lateral extensions 65, and 66, to the free ends of which is secured a cross bar 70, provided with slots to maintain the lower ends 71, of the jacks 55, in proper alinement. Each alternate jack is steadied in its motion by means of the slots in bar 70. The remaining alternate jacks are guided by a second slotted cross bar 72, which bridges the top of slide blocks 58, and 59. The jacks 56, are further guided at their upper ends between a pair of angle plates 73, which are secured to needle bed 17, and prevent any lateral motion of the jacks, as best seen in Fig. I. The upper or heavy ends of the jacks 55, and 56, normally rest upon the needle bed in readiness to engage the lower butts of the needles.

In the process of knitting according to my invention, the whole series of jacks on one side of the machine are moved bodily upward by means of a pair of arms 74, and 75, which are slotted at their outer ends to engage the fulcrum rod 57, and are secured to a rock shaft 76, which is journaled in the standards 15, and 16. A similar rock shaft 77, lifts the series of jacks on the other side of the machine. Secured to the shaft 76, slightly to the right of the standard 16, is an arm 78, carrying a roller 80, on its free end, which roller normally engages a cam wheel 82, (see Figs. II and IX). The shaft 77, on the other side of the machine carries an arm 79, having a roller 81, which likewise engages the cam wheel 82. The cam projections on said cam wheel operate first on one rock shaft 76, and then on the other rock shaft 77, and consequently lift the needle jacks first on one side and then on the other.

During the formation of the heel of the stocking, the rock shafts 76, and 77, are shifted to the left, as viewed in Fig. II, thereby moving the rollers 80, and 81, out of the path of the cam wheel 82. The rock shaft 76, carries a second arm 83, that is provided with a roller which by the shifting of the shaft is brought into engagement with a second cam wheel 84, which has double cam projections, as shown in Fig. VII. The arm 79, on the rock shaft 77, has a second roller 85, that during the shift is brought into engagement with the cam wheel 86, having double cam projections similar to the cam projections on the cam wheel 84. These double cam wheels 84, and 86, will lift the needle jacks twice on one side of the machine and then twice on the other side thereof. The shaft 77, is also provided at its right hand end with a finger 87, which lies in the path of a pair of pins 88, and 89, on the left side of a ratchet wheel on the same shaft as drum 36. See Fig. VIII. When these pins engage the finger 87, the shaft 77, is rocked, and the needles on the front of the machine raised. This occurs during the starting of the toe of the stocking. The pins only lift the needles slightly above the hooks of the needles at the rear of the machine, which are at this time raised, and, therefore, a thread can be laid into the hooks of all the needles both at the front and rear of the machine. The needles which are to be lifted during the raising of the jacks, may be controlled by moving the jacks from operative engagement with the needles. By means of the individual jacks for the needles, their knitting may be controlled in the following manner: When the lower ends of the jacks 56, are pressed inwardly by a mechanism which will be explained later, their upper heavy ends will be raised from the path of the lower butts 54, of the needles 50. The jacks thus acted upon will be ineffective upon their corresponding needles in raising them to the stitch level. In this manner, certain needles may be thrown into or out of action, the stocking fashioned and the heel knit.

*IV. The controlling drum and its adjunctive parts.*—Fulcrumed to the under side of the bed plate is a lever 90, best shown in Figs. III, and VII, whose free bifurcated end carries a rotatable stud 91, which is embraced by the bifurcated end of a link 92, and is movably secured thereto by means of a pin 93, thereby forming a sort of a universal joint, (see Figs. I, III and VIII). The other end of the link 92, is pivoted to the rocker arm 10, at a point somewhat above that at which the eccentric rod 9, is secured. The lever 90, is, therefore, caused to oscillate in a horizontal plane in synchronism with the rocker arm 10. The lever 90, carries buffers 94, which are adapted to engage adjustable set screws in the free ends of tappet arms 95. The oscillation of the lever 90, causes a similar motion to be imparted to the tappet arms 95, about the vertical pins 96, to which they are secured. The pins 96, extend through bed plate 1, and terminate at their tops in bearing brackets 97. Arms 98, are secured to the pins between the top of the bed plate 1, and the bearing bracket 97, and their outer ends are connected by means of links 99, to the bottom cross bar 100, of a yoke 101, which comprises also a top bar 102, and the side bars 103, and 104, and is subject to the action of a spiral spring 105. (See Fig. III). The said side bars are loosely mounted at 106, and 107, on a horizontal shaft 108, whose left hand end is secured in the standard 16, and the other end in a supporting bracket 109, at the right hand end of the machine, as seen in Figs. II and VI.

The controlling drum 36, previously mentioned, is loosely mounted upon the shaft 108, directly adjacent to and at the left of the side bar 104, of the yoke 101. (Figs. I and II). To the left side of the drum 36, is secured a ratchet wheel 111, which is adapted for intermittent rotation, owing to the teeth omitted at 112, 113, 114, 115 and 116. The ratchet is operated upon by a pawl 120, which is loosely pivoted between collars 121, upon a cross rod 122, whose ends are secured in the side bars 103 and 104, of the yoke 101. (See Fig. VIII). A guard 123, which extends over a portion of the periphery of the ratchet wheel 111, prevents excessive pawling thereof, which would otherwise occur, owing to the extent of motion of the yoke 101.

Loosely mounted between the side arm 103, of the yoke 101, and the ratchet wheel 111, is a second ratchet wheel 125, which is disposed between, and supplemented by the cam wheels 82, and 84, above described. The cam projections of the cam wheel 82, which are symmetrically spaced, operate upon the rollers 80, 81, on arms 78, and 79, which are respectively secured to the rock shafts 76, and 77, effecting the motion of the jacks, as already described. This cam wheel 82, is used in knitting the greater portion of the stocking, as will be better understood in the description of the operation of the machine. The cam wheel 86, above described is also secured to the loose sleeve, upon the shaft 108, and is identical with the cam wheel 84, to the right of ratchet wheel 125, in that its teeth are spaced in pairs about its periphery. Cam wheels 84, and 86, are effective during the knitting of the heel pocket of the stocking, as will be more definitely set forth hereafter. The ratchet wheel 125 is adapted to be picked by a pawl 129, also mounted between a pair of collars 130, upon the cross rod 122, of yoke 101.

During a portion of the knitting of the seams at the toe and also that at the region of fashioning of the stocking, the needles at the side of the machine, shown in Fig. I, are used alone. In order to permit this, the ratchet wheel 125, is rendered idle by the temporary lifting of its pawl 129, in the following manner: A pin 131 (see Fig. VII), extends laterally from the pawl 129, and is adapted to be raised by means of a dog 132, which is pivoted to an extension arm 133, of the roller arm 83, at the right hand end of the shaft 78, already mentioned. Normally the dog 132, is actively suspended by means of a guard wire 135, which rests upon the reduced portion 136 of the cross rod 122, supported by the yoke 101.

The dog 132, consists of two parts 137, and 138. The part 138, is bifurcated to receive the part 137, and is pivoted thereto by means of a screw 139. The free end 140 of the part 138, is curved and adapted to engage the pin 131, extending from the pawl 129, and thereby raise it to render it inactive when the cam plate 141, depending from part 137, is engaged by either of the segments 142, or 143, carried on the left side of the ratchet wheel 111. A flat spring 145, is secured to the bottom of the part 137, of the dog 132, and exerts pressure upon the other part 138. A pin 146, on part 137, and notches 147, in the sides of the part 138, coact with spring 145, to keep the said two parts of the dog 132, normally in alinement, but permit them to yield when the cam plate 141, is acted upon by either of the segments 142, or 143, on the ratchet wheel 111, already described. The part 138, of the dog 132, is also provided near its free end with a notch 148, which is adapted to engage the reduced portion 136, of the cross rod 122, of the yoke 101, which is clearly shown in Figs. VII and VIII. When the dog 132, is raised, the pawling of the ratchet wheel 125, is stopped, and the oscillation of the yoke 101, is imparted through the arm 133, to the shaft 76, and the knitting takes place only on the side of the machine shown in Fig. I. When this portion is knit, the shafts 76, and 77, are shifted to the left by means of a lever 150, whose upper end is bifurcated to embrace a tie rod 151, whose ends are secured to collars on the said shafts 76, and 77. See Figs. I and II. The lever 150, is secured to a pin 152, which is capable of being shifted within a bearing bracket 153, (see Fig. V). A spring 154, serves to keep the end of the pin 152, in contact with a rotatable cam 155, on a countershaft 156, journaled in brackets 157, depending from the bottom of the bed plate 1. When the pin 152, is permitted to drop into the slot 158, of the cam 155, the spring 154, causes the lever 150, to be drawn toward the bracket 153. The lower portion 159, of lever 150, is thereby brought into the path of a cam plate 160, which is secured to the hub of the eccentric 7, on the main shaft 3.

The engagement of the cam plate 160, with the lower end 159, of the lever 150, causes its upper end to shift the shafts 76, and 77, to the left, so their respective roller arms 78, and 79, are retracted from the path of the cam wheel 82. The shaft 76, after shifting will be subject to the action of the cam wheel 84, upon its arm 83. Similarly, shaft 77, will be subject to the action of cam wheel 86, upon the roller 85, on the left side of arm 79. In order to restore the shifting mechanism to its normal position, the high portion of cam 155, operates to push the lever 150, so that a cam plate 165, at the back of its lower end 159 (Fig. I), is brought into the path of a pin 166, carried upon the side of eccentric 7. The lower end of the lever 150, is thereby pulled toward the main shaft 3, and results in the shifting of the shafts 76, and 77, to the right to restore the parts to the position illustrated in the drawings.

V. *The measuring chain.*— Referring more particularly to Figs. I, II, VI and VIII, near its top, the rocker arm 10 carries a tappet plate 170, adapted to engage the arm 171 of a bell crank lever 172, which is fulcrumed between two collars on a vertical post 173, projecting up from the bed plate 1. The other end 175, of the bell crank lever 172, is in constant engagement with an arm 176, which is loosely mounted upon a shaft 177, projecting laterally from a bracket 178, which is bolted to the bed plate 1, of the machine.

An arm 176, carries at its free end a pawl 179, and is normally retained in the retracted position shown in the drawings, by means of a spiral spring 180. Directly adjacent to the left of arm 176, (Figs. I, XIX and XX) a ratchet wheel 181, is also mounted loosely upon the shaft, and is acted upon by the pawl 179, which also serves to pick a second ratchet 183, when permitted by the deep spaces 184, and 185, in the ratchet wheel 181 (Fig. XX). It will thus be seen that for every ten complete reciprocations of the machine, the ratchet wheel 183, will be pawled one tooth.

The smaller ratchet wheel 183, is cast integral with a sleeve 182, which is adapted to rotate about the shaft 177, and is retained in position thereon by means of a collar 186. A sprocket wheel 187, is also cast integral with the sleeve 182 (see Fig. XIX), and supports a measuring chain 189, which in the present instance consists of sixty-five links, but this number may be varied according to the length of stocking that is to be knit.

The teeth of the sprocket 187, are related to the teeth of the ratchet 183, respectively in the ratio of one to two, and it is, therefore, obvious that the chain is moved the distance of a link for every two picks of the ratchet wheel 183, or every complete revolution of the ratchet wheel 181.

The measuring chain 189 comprises special hooked links 190, 191, 192, 193, and 194, which respectively engage a series of pins 195, 196, 197 198 and 199 mounted upon the periphery of the drum 36, already mentioned, and thereby control the timing of the formation of the toe, heel and fashioning of the leg of the stocking in a manner which will be described in connection with the operation of the machine.

VI. *The fashioning mechanism.*—Extending laterally from the hub of the eccentric 7, is a pin 200, which is connected through a universal joint to a link 201, which is similarly connected to an arm 202, secured to a rock shaft 203, which extends from the center of the machine to the left hand end, as viewed in Figs. I, II and III, and is journaled in brackets 205, depending from the under side of the bed plate 1.

An arm 206, secured to the shaft 203, near its left hand end, carries a pivoted block 207, which engages a slot 208, in a depending arm of a link 210, whose extremities are pivoted at 211, and 212, to oscillating arms 213, and 214, which are loosely mounted upon the worm shafts 215, and 216, respectively. The said worm shafts are journaled in brackets 217, and 218, respectively, bolted to the top of the bed plate 1, (see Fig. II).

The mechanisms for rotating the worm shaft are two in number. These mechanisms are identical but highly complicated, and had, therefore, better be described separately. Beginning with the one on the right side, which operates the side of the machine illustrated in Fig. II, the oscillating arm 213, already described plays (see Fig. XVII) between a pair of lugs 219, on the back of a drum 220, which is also loosely mounted upon the worm shaft 215, see Figs. XVI, XVII and XVIII. The back of the drum 220, is extended so as to form a flange 221, which serves at that end to retain a series of ratchet rings 222, 223, 224, 225 and 226, which are adapted to revolve upon the face of drum 220. At the other end of drum 220, the rings 222, to 226 inclusive, are retained by the overlapping portion 227, of a bearing plate 228, screwed to the edge of said drum, and a second plate 229, which extends from the worm shaft 215, upon which it is loosely mounted, extends slightly beyond its periphery. Plate 229, is also screwed at 230, to the edge of the drum 220. (See Fig. IV.)

The first three of the series of ratchet rings, namely 222, 223 and 224, are adapted for rotation in a counter-clockwise direction by means of a pawl 231, and the remaining two in a clockwise direction, by a similar pawl 232. Pawls 231, and 232, are loosely mounted upon a stud 233, which is secured to the free end of oscillating arm 213, and extends to a similar arm 234, adjacent to the opposite side of drum 220, and which is also loosely mounted upon the arm shaft 215. The ratchet rings 222, 223, 224, 225 and 226, are respectively provided with blank spaces 235, in which the pawls 231, and 232, play idly during the inactivity of the rotating mechanism. Ratchet rings 222, to 226, are also respectively provided with high teeth 236, whose purpose will be later described.

As shown in Figs. XVI to XVIII, inclusive, the drum is hollow for the reception of oppositely disposed ratchet pinions 239, and 240, which are respectively pawled under the control of the two groups of ratchet rings 222, 223, 224, 225, and 226, respectively.

By means of ratchet pinion 239, the worm shaft 215, is rotated in a clockwise direction, and in the opposite direction by the pinion 240. The pawls 250, 251, 252, 253 and 254, effecting the motion of ratchets 239, and 240, correspond respectively in number to the ratchet rings 222, 223, 224, 225 and 226, and are likewise grouped.

Pawls 250 to 254, inclusive, are pivoted upon a stud 255, extending from the back of drum 220, and terminating in the bearing plate 228, already described, and best seen in Fig. XVI. The said pawls are provided with fingers 256, on the opposite sides of their pivotal point. These fingers are adapted to be engaged by notches 257, in the inner peripheries of the cam rings 222 to 226, inclusive, respectively. When these fingers are permitted to drop into the said notches under the influence of springs 258, on the pawls 250, to 254, inclusive, the opposite ends of the said pawls move into the path of the ratchet pinions 239, and 240, and thereby engage them in a manner and in the order, as will be explained in connection with the operation of the machine.

Adjustable stops 260 and 261, are secured to the outer edge of drum 220, and respectively coöperate with abutting buffers 262 and 263, respectively, which are bolted to the top of bed plate 1. The extent of effectiveness of rings 221, and 222, is limited by a guard 265, which extends over a portion of the periphery of ratchet 239. By this means, pawls 251, and 252, are permitted to pick said ratchet only one tooth at a time, while the unguarded pawl 250, picks two teeth at a time. The guard 270, which affects pawl 254, of the other group, also limits the picking of the ratchet 240, to one tooth at a time, while the other or unguarded pawl 253, is permitted to pick two teeth at a time.

The just described features are made use of during the formation of the heel pockets, and correspond in function to the devices controlling the action of the pickers in ordinary knitting machines.

Referring to Fig. VI, a series of projections 275, 276, 277, 278, 279, 280, 281 and 282 also are mounted upon the controlling drum 36, and are adapted to engage a cam finger 283, pivotally mounted on a bracket 285, at the right hand end of the machine (Fig. I). See also Figs. VI and VIII. An arm 286, extending substantially at right angles from the said finger 283, is connected by means of a link 287, which passes through an aperture 288, in plate 1, to a plate 289, mounted loosely upon countershaft 156, already referred to. The plate 289, is held in place between a collar 290, and a ratchet wheel 291, which are both fixed upon the shaft 156, and carries at the end of its arm 292, a pawl 293, which is adapted to engage the said ratchet 291, and imparts thereby its motion to the said shaft 156. A spiral spring 295, serves to return the plate 289, to its active position after each pick of the pawl 293.

Near the left hand end of the machine (Figs. I, III and IV) a trip wheel 296, is secured to the shaft 156, and is adapted to engage a cam lug 297, on a trigger plate 298, which is pivoted on a bracket 299, depending from the under side of bed plate 1. Between the rocker arm 206 and collar 300, the shaft 203, loosely supports a lever 301, whose lower end 302, is provided with a pin 303, adapted to engage notches 304, and 305, in the free end of trigger plate 298. The said trigger plate is maintained in contact with pin 303, by means of a tension spring 306, which is secured to a lug 307, extending from lever 301. When the trigger plate 298, is trapped by one of the projections on the wheel 296, a spiral spring 310, acting upon the upper portion 311, of lever 301, causes the pin 303, in its lower end 302, to drop from the position shown in the drawings, into the notch 305. This allows the upper end of the lever 301, to move far enough to the left (Fig. IV) to move a pin 312, carried on the back thereof into the path of the oscillating arm 206.

During the engagement of the oscillating arm 206, and co-acting pin 312, the lower end of the lever 301, is moved to the left, so that the action of the spring 306, becomes effective in restoring the engagement between the pin 303, on said lever, and the notch 304, in the end of trigger plate 298, as shown in Fig. IV. The upper end 311, of lever 301, is slotted at 313, and engages a pin 314, which projects laterally from a link 315, whose ends are pivotally connected to pawl arms 316, and 317, which are loosely mounted upon respective shafts 318, and 319, on opposite sides of the machine.

The parts carried by the shafts 318, and 319, are identical on each side of the machine; therefore to avoid duplication in description, one side will be described alone, as before, it being understood that the corresponding parts on the opposite sides, are substantially similar in operation.

The shaft 318, is journaled in brackets 320, and 321, which extend up from the bed plate 1, and are secured thereto. The arm 316, already described, is loosely mounted upon the left hand end of the shaft 318 (Figs. I and II) between the bearing on the bracket 320, and a ratchet wheel 322, which is secured to said shaft. The arm 316, pivotally supports at its upper end a spring pressed pawl 323, which is adapted to engage ratchet wheel 322, to rotate the shaft 318. A spring 325, acts upon the teeth of the ratchet 322, and prevents accidental slippage.

Mounted upon the shaft 318, are a pair of wing spiders, comprehensively indicated at 326, and 327, respectively. Spider 326, comprises a pair of hubs 328, and 329, which are slidably mounted upon the shaft by means of keys that engage the slot 330, therein. These hubs are provided with radial flaps, to which are secured the depressing wings or fashioning plates 331, 332, and 333, which operate upon the pivoted needle jacks 55, as will be more definitely described later. The spider 327, also comprises two hubs 335, and 336, which respectively carry radial flaps, to which are secured fashioning plates 337, 338, 339, 340 and 341, which also operate upon the needle jacks during the several fashioning steps necessary in the formation of a stocking. The hubs 328, and 336, of the spiders 326 and 327, are respectively rotatably secured in the upper ends of arms 345, and 346, which are provided at their lower ends with bosses 347, and 348, within which the oppositely disposed worms 349, and 350, on the shaft 215, operate.

Arms 345, and 346, are adapted to be moved backward and forward by means of the worms 349, and 350, relatively in contrary directions, to vary the number of needles in fashioning, as will be described later. In order to more rigidly support the arms 345, and 346, during their motion, they are provided with set screws 351, and 352, which are adjustably supported in plates 353, and 354, projecting from them, and roll upon balls 355, which follow a groove 356, formed in the top of bed plate 1, as best seen in Fig. V. A bracket 360, bolted to the bottom of the bed plate 1, is provided with a cross bar 361, which is located directly under the drum 220, already described. Slidably mounted upon the cross bar 361, are a series of tripping blocks 362, 363, 364, 365 and 366, which as best seen in Fig. XVII, are provided with pins 367, forced against the said cross bar by means of springs 368, and which are arranged to be retained in their uppermost positions by the engagement of the ends of said pin 367, with the detent recesses 369, in the side of the bar 361. By this means, the said blocks remain in whatever position placed. The blocks 362, 363, 364, 365 and 366 are provided at their bottoms with cam ribs 370, which are adapted to be engaged by a series of corresponding cams 371, 372, 373, 374 and 375 on the shaft 156.

When the shaft 156, is rotated to bring the cam 371, into engagement with the trip block 362, the latter is raised into the path of the high tooth 236, of the ratchet ring 222. In the oscillation of the drum 220, in a clockwise direction, the upper edge, of the block engages the high tooth 236, in the ratchet ring 222, so that the blank space 235, of the said ring is slightly advanced to permit the picking of the said cam ring by the pawl 232. The other trip blocks act in the same manner upon the remainder of the ratchet rings, and further description will, therefore, be unnecessary. In order to operate the similar trip blocks on the other side of the machine, shaft 156, is provided with a bevel pinion 380, which meshes with a similar pinion 382, on a shaft 383, which is journaled in brackets 384, depending from the bed plate 1. The other end of the shaft 383, carries the bevel pinion 385, which imparts motion to the co-acting pinion 386, upon the shaft 387, on the other side of the machine.

To the bottom edge of the needle bed 17 (Figs. XII and V) is pivoted a plate 390, having a raised portion 391, which during the knitting of the heel of the stocking retains a number of the jacks 55, in their raised position, and their corresponding needles, which are used only in the fashioning of the leg of the stocking, are thereby rendered idle. The shifting of the shaft 76, during the stage of the knitting already mentioned, causes the cam 392, carried on the end of the tie rod 151, to engage the notch 393, in the bottom edge of plate 390, to raise the said plate to perform the function just stated.

The parts just described are, of course, duplicated upon the other side of the machine, the corresponding elements operating in substantially the same manner.

*VII. The stitch cam carriage.*—As best shown in Fig. XI, the carriage 399, comprises a pair of cam bars 400, and 401, which are connected at their ends by means of yokes 402, and 403, to which they are secured. The cam bar carriage 399, is adapted to be reciprocated by means of the rocker arm 10, the top end of which is connected by means of a link 404, with the yoke 403, at the right hand end of the machine, as seen in Fig. I. The cam bars 400, and 401, are guided in their motion in guides 405, 406 and 407 and 408, which are respectively screwed to the end standards 15, and 16, which support the needle beds.

*VIII. The stitch cams.*—Each of the cam bars 400, and 401, is provided with a stitch cam, and as these cams are identical on each side of the machine, the description will be confined to one of them,—preferably that shown on the side of the machine illustrated in Fig. I. Referring now particularly to Figs. XIII to XV inclusive, the bar 400 is provided at its middle point with a stitch cam 410, which is capable of vertical movement, being guided between a pair of supplemental cams 411, and 412, as shown in Fig. XIV. The upper needle hubs are normally maintained at the level of the top of a guard cam 413, which is secured to the bar directly beneath the stitch cam. For the remainder of the lengths on each side of the stitch cam, the bar 400, is provided with a comparatively wide groove 415. In the process of knitting according to my invention, the needles knit only when their upper butts 51, are raised by means of their respective jacks 55, into the path of the stitch cam 410, whereupon they are drawn down, thereby to form stitches, and thereafter so remain until again acted upon by the said jacks. This "lifting" of the needles is accomplished at the end of the strokes of the machine, when the wide grooves 415, of the cam bar 400, on each side of the stitch cam, are shifted to the region of the action of the needles.

The stitch cam 410, is secured by means of screws 416, to a sliding plate 417, on the outside of the bar, and is spaced therefrom by means of sleeves 418, which surround the said screw 416, and play within slots 419, in the back of the bar 400. The plate 417, is moved between guides 420, and 421, on the outside of the bar, and is provided with a lateral projection 422, which supports a pair of set screws 423.

Pivoted at 425, to the outside of the bar, is a lever 426, whose outer end plays within the guide bar 421, and is normally held against a stop 427, by means of a tension spring 428. The slide plate 417, is subject to the action of a spring 430, secured to an arm 431, depending from the lever 426, and the screws 423, are thereby constantly held in contact with a rotary cam 432, which is secured to the back of a ratchet pinion 433, loosely mounted upon a stud 434, screwed into the lever 426.

Rotation of the ratchet 433, will cause the raising and lowering of the stitch cam, depending upon the action of the high and low portions 435, and 436, respectively, upon the screws 423, carried by the projection 422, of the slide plate 417. A spring 437, mounted upon the end of the lever 426, acts as a brake for the ratchet pinion 433, and thereby prevents any accidental displacement thereof. The raising of the cam 410, places this cam in the proper position for starting the first stitches at the toe on the new stocking as will be explained later. At its free end, the arm 431, depending from the lever 426, carries a roller 438, which during the formation of the heel rides upon the raised or idle jacks 55, so as to elevate the lever 426, and, therefore, the stitch cam 410, by reason of its connection therewith, prevents the stretching of the loops held upon the idle needles during that stage of the process of knitting.

IX. *The sinkers and the sinker cam bar carriage.*—The sinkers, of which there are two sets, one on each side of the machine to correspond to the division of the needles, are pivotally mounted upon rods 445, 446, which extend respectively within slots 447, 448, cut into the sinker bars 449, 450, which are secured to the needle beds 17, and 18. The sinkers here shown perform a double function, first that of holding the web by means of their nubs 451, and 452; and second, of guiding the web by means of their curved noses, as indicated at 453, 454. The sinkers are oscillated about their pivots by means of their tails 455, which are operated upon by the cam grooves 456, 457, in their respective cam bars 458, 459. See Figs. V, and XI.

The cam bars 458, 459, are coupled at their ends by means of connecting plates 460, and 461. It will be remembered that the cam bar 458, is guided in the sinker bar 449, which is secured to the movable needle bed 11. The sinker cam bar 458, is, therefore, not permanently secured to the connecting plates 460, 461, but is provided with slots, which are respectively engaged by blocks 462, and 463, screwed to the said plates 460, and 461.

Secured to the center of the sinker cam bar 458, is a bracket 465, which adjustably supports the thread feed 466, having a guide hole which may be supplied from any suitable bobbin, not shown in the drawings. (See Figs. I, V, X and XIII). The said sinker cam bars 458, 459, also carry at their centers, vertically projecting plates 467, and 468, which are slotted to receive pins 469, 470, projecting from slide blocks 471, 472, respectively. These blocks slide and are guided upon rods 473, and 474, which are respectively secured to the sinker bars 458, and 459. Screwed to the blocks 471, and 472, are latch openers 475, and 476, having cam nibs 477, 478, which in their motion protrude under the latches of the needles, and thereby open them in readiness to take the thread.

Coöperating respectively with the latch openers 475, and 476, are leveling bars 498 and 499. These bars extend longitudinally the full length of the needle bed and have a beveled edge, see Fig. V. The leveling bar 499 has a beveled edge in line with the needles 51, when they are raised and serves to bring all the needles absolutely in a direct line and the proper distance from the point of the latch opener. This avoids any possibility of the latch opener striking the needles and bending or breaking the same. The leveling bar 498, operates in a similar manner in connection with the needles on the other side of the machine. The leveling bar 499, is attached to the sinker bar 449, while the leveling bar 498, is attached to the sinker bar 450. By this arrangement the leveling bars will maintain the same relative position to the needles, regardless of the position of the needle bed plates. The sinker cam bar carriage 480, is adapted to move in synchronism with the stitch cam carriage 399, except when the work is to be pressed off by means of a certain mechanism which will be described later. A certain amount of lost motion is, however, necessary between these two carriages to permit the thread feed to be at all times in the lead of the stitch cams, and this is accomplished by the parts about to be described.

Referring more particularly to Figs. X, and XI, the connecting yokes 402, and 403, of the stitch cam carriage 399, are provided respectively with bifurcated depending lugs, between which are pivoted dogs 481, and 482, as indicated at 483, and 484. Set screws 485, and 486, respectively, playing in slots in the tops of the yokes 402, and 403, limit the amount of motion of the dogs 481, and 482, respectively. When the stitch cam bar carriage 399, moves to the left, as shown by the arrow in the drawings, the notch 487, on the dog engages a block 488, on the connecting plate 461, of the sinker cam bar carriage, which is, therefore, moved until the cam incline 489, on the end of the dog 482, strikes the top of an adjustable lifting plate 490, which is mounted upon a bracket 491, projecting from the end standard 16, as best shown in Fig. X. As soon as the engagement between the dog 482, and the block 488, is broken, the sinker cam bar carriage 480, comes to rest, while the stitch cam bar carriage completes its stroke in that direction. In the return stroke of the stitch cam bar carriage, the notch 492, on the dog 481, engages a block 493, on the connecting plate 460, already mentioned, which causes the sinker cam bar carriage to be moved until the dog 481, is tripped by a lifting plate 495, which is secured to the bracket 496, on the standard 15. The sinker cam bar carriage 480, thereupon comes to rest, while the stitch cam bar carriage 399, completes its return motion in a manner precisely the same as that before described. A cursory examination of the drawings will show that by this means the thread feed 466, will be kept constantly in advance of the stitch cams, no matter what the direction of reciprocation.

In order to permit the pressing off of a finished stocking, the sinker cam bar carriage 480, and, therefore, the thread feed 466, carried thereby, is rendered idle for a double reciprocation of the machine, which corresponds to a course of knitting, by means of the parts about to be described. A rock shaft 500, extends longitudinally across the machine, and is journaled in standards 15, and 16, and carries at its right hand end a cam finger 501, which is adapted to be engaged by a cam 502, also mounted upon the periphery of the controlling drum 36, see Figs. I and VI. Mounted upon the shaft 500, between the standard 16, and the finger 501, is a tappet arm 503, which engages a spring-pressed slide rod 505, which is guided in a bracket 506, secured to the guide 407, for the stitch cam bar 400. The upper end of the slide rod 505, is adapted to engage a collar 510, on the right hand end of a rod 511, which extends between and is slidably mounted in bosses 512, and 513, cast integral with the connecting yokes 402, and 403, of the stitch cam bar carriage. The rod 511, at its left hand end is provided with a laterally projecting pin 515, which is adapted to engage a cam hook 516, on the top of the dog 481. The rod 511, is normally maintained in the position shown in the drawings, by means of a pin 517, extending from the left hand end of the sinker bar 449, as best shown in Fig. I, which engages a collar 518, on the left hand end of the rod 511.

When it is desired to "press off" the work from the machine, the engagement of the cam 502, on the drum 36, with the finger 501, causes the slide rod 505, to be moved into the path of the collar 510, on rod 511. This causes the pin 515, to be shifted under the cam hook 516, on the dog 481, thereby breaking the engagement between the stitch cam carriage and the sinker cam carriage, whereby the latter remains idle for a double reciprocation of the machine, which corresponds to a course of knitting. It will be remembered that the thread feed is carried by the sinker cam carriage, and that, therefore, no thread would be fed to the needles during this "pressing off" operation of the machine.

*X. Mechanism for raising and lowering the stitch cams.*—The drum 36, is provided upon its periphery with cams 525, and 526, which operate upon a finger 527, secured on a shaft 528, (see Fig. VI), which is journaled in the end standards 15, and 16, which support the needle beds. At the opposite ends of the machine (Fig. IV) a tappet finger 529, is secured upon the shaft 528, and engages a similar finger 530, on a second shaft 531, journaled in the end standards. The motion thus imparted to the shaft 528, by reason of these connections, is transmitted to the shaft 531. The said shaft 531, is on the side of the machine shown in Fig. I, and supports a tappet arm 532, which engages a rod 533, slidably mounted in a bracket 534, extending from the cam bar guide. The upper end of the rod 533, engages the tail of a dog 535 (Fig. I), which is spring pressed and pivoted at 536, to the said bracket. When the rod 533, is raised by the motion of the shaft 531, the free end of the dog is moved into the path of the ratchet pinion 433, thereby rotating the cam 432, attached thereto in a manner already described, and which ultimately results in the raising and lowering of the stitch cam. As shown in Fig. VI, the shaft 528, also supports a tappet finger 540, which engages a slide rod 541, mounted in a bracket 542, extending from the slide bracket 408, for the cam bar 401. The rod 541, also engages a dog 543, similar to the dog 535, already described, which performs a like function in the operation of the stitch cam on the opposite side of the machine.

*XI. Operation of the machine.*— In the operation of the machine, during the knitting of the last course at the top of the finished stocking, the pattern chain engages the change drum and turns it sufficiently so as to bring the pawl carried by the oscillating yoke into engagement with the ratchet teeth on the change drum. The change drum will then be rotated until another blank tooth comes under the operating pawl. The rotation of the change drum brings the cam 502, into engagement with the finger 501, which oscillates the rock shaft 500, and through the tappet arm 503, lifts the rod 505, into the path of the collar 510, on the rod 511. The rod 511, through the pin 515, lifts the locking dog 481, from engagement with the sinker cam carrier, so that on the next reciprocation of the stitch cam carriage, the sinker cam carriage remains idle, and also the thread carrier which is mounted thereon. This reciprocation of the stitch cam carriage depresses all the needles and presses off the finished stocking from the machine. At the end of this reciprocation, the oscillation of the rock shaft 528, will throw the dog 535, into the path of the ratchet wheel 433, controlling the cam 432, which shifts the stitch cam 410, up and down, putting the stitch cam in the proper position for starting the first row of stitches at the toe of the next stocking. The thread carrier and latch opener, however, are again picked up by the stitch cam carriage on the next double reciprocation as the continued rotation of the change drum causes the rock shaft 500, to return to its normal position. As the stitch cam carriage reciprocates, the latch openers lift the latches of the needles preparatory to beginning the next stocking.

The continued rotation of the change drum, causes one of the pins 88 or 89, to engage the finger 87, carried by the rock shaft 77, which lifts the needles at the rear of the machine as viewed in Fig. I, to a position slightly above the hooks of the needles on the opposite side of the machine, which are at this time normally raised. The thread carrier as it reciprocates, lays the thread into the hooks of the needles both at the front and the back of the machine, and, therefore, the stitches are hooked on to the needles used in knitting the foot of the stocking on both the needle beds. This forms a setting-up course to begin the automatically closed toe of a new stocking. On the movement of the carriage in the opposite direction, the needles at the rear of the machine drop to a position slightly below the needles in the front of the machine, and remain idle in this position during several reciprocations of the stitch cam carrier.

The continued movement of the change drum lifts the pawl from the ratchet wheel, which operates the cam wheels for raising and lowering the needle jacks, so that said cam wheels become idle. The pawl-lifting arm which is connected to the rock shaft 76, is coupled directly to the yoke 101, which rotates the change drum, and the vibrations of this yoke will raise and lower the needle jacks 55, at the front of the machine, and a plurality of courses will be knit upon these needles, and at the same time cam 410, will be brought down to its normal position. This same movement of the change drum will bring a space between the cam plates 34, and 35, in front of the finger 33, and allow the same to move toward the change drum, which in turn allows the spring to raise the needle bed at the front of the machine, to bring the knitting position of the needles closer to said idle needles holding the first course of stitches and this positioning of the needles occurs before the knitting of the courses forming the strengthening gore thus enables the stitches, throughout the entire toe to be made of equal length, and to form a toe wherein there in practically an invisible starting point. This same movement of the change drum also operates through the shaft 156, and its connected parts, to rotate the fashioning plates which control the needle jacks, so that only the needles which are used to knit the foot of the stocking are thrown into action, both at the front and the rear of the machine. In the present machine, I have arranged to knit six courses on the needles at the front of the machine as viewed in Fig. I, but this number of courses may be changed to any number desired to suit the work being knit. These six courses form what I term the strengthening gore for the toe of the stocking.

As soon as the parts are positioned for the knitting of the six courses above referred to, the change drum becomes idle, and remains so until the six courses are finished. The pattern chain will then again turn the change drum to throw the same into action, and a rotation of the same will release the pawl-lifting arm from the yoke, and set into action the ratchet wheel for rotating the cam wheels which lift the needle jacks. This same movement of the change drum will operate through the shaft 156, to again rotate the fashioning plates, so that all the needles are rendered idle or thrown out of action, still, however, retaining their stitches, except the central needles on both beds, which are used in the forming of the end of the toe. This rotation of the shaft 156, will also throw into action the ratchet rings which control the worm shafts, and as the machine proceeds with the knitting, the worm shafts will be rotated, which will gradually separate the fashioning plates longitudinally, and throw into action two needles, first on one side and then the other of the machine for each complete reciprocation thereof. The number of needles, however, which are thrown into action, may be varied, and, thereby the shape of the toe changed at will. By thus throwing into action two needles, first on one side and then the other, a gradual widening of the toe will be accomplished, and a tube will be knit in which the widening stitches are united with the outside stitches of the previously formed gore which is held by the idle needles.

After the finishing of the toe, the foot of the stocking is knit by the normal operation of the machine, the needle jacks first on one side and then the other being lifted by the cam wheel 82. When the heel of the stocking is reached, the pattern chain again turns the change drum, so that a pin on the change drum engages and rotates the shaft 156, which throws the lever 150, into action, and this lever in turn will shift the rock shafts which raise and lower the needle jacks, so that the rollers carried thereby are brought into engagement respectively with the cam wheels 84, and 86. These needle-lifting fingers are so constructed and arranged relative to each other, as to lift the needles twice on the front side of the machine, and then twice on the rear side of the machine. This same movement of the change drum will also turn the fashioning plates so as to render idle one-half of the needles at the same ends of both beds used in knitting the foot; while the other half of the needles are used for the formation of the heel. The raising of the needles twice first on one side and then on the other of the machine, causes the thread carrier to lay the thread into the needles on the front of the machine in a direction toward the idle needles, and then back again away from the idle needles, thus avoiding the connecting of the two sides at the central portions of the needles. The thread is then laid into the rear needles and back again. This same movement of the change drum will also throw into action another of the ratchet rings which control the worm shafts, and as the worm shaft is rotated, a certain number of needles are thrown out of action, and then again into action at the center of the beds, so as to properly form the heel. As above noted, the ratchet rings are so controlled that one needle is affected during the rotation of the worm gear in one direction and two needles during the rotation in the opposite direction. After the heel is completed, the pattern chain again turns the change drum into action, which puts the machine back into normal position, shifting the rock shafts which lift the needle jacks, so as to bring the operating rolls into engagement with the cam wheel 82.

In order to fashion the leg of the stocking, practically the same operation takes place as in fashioning the toe. The pattern chain rotates the change drum, the fashioning plates are likewise rotated so that all the needles which are knitting, are rendered idle, and the needles only which are to be used in the widening of the leg are raised, while a thread is laid into both the needles in the front and rear of the machine, and a plurality of courses preferably six, are knitted on the needles at the rear of the machine only; after which the machine is restored to normal position, and the knitting proceeds on the regular needles which were idle, and one after another the widening needles are thrown into action, thus joining the strengthening gore at its edges with the united widening stitches.

During the knitting of the remainder of the stocking, all of the needles are in action. The change drum again controls another ratchet ring which is thrown into action to rotate the worm shaft, so as to bring the fashioning plates back into normal position for the first operation in the stocking. The stocking is pressed off as above stated.

In Fig. XII, I have shown more or less diagrammatically a stocking in which is indicated between 548 and 549, the toe of the stocking; the strengthening gore for the toe extends from the point 550 to 548, on one side of the toe and 551, to 549, on the other side of the toe. The strengthening gore in the leg of the stocking extends from the point 553, to the point 554. This strengthening gore, inasmuch as its outside stitches are united by the widening stitches, will produce a slightly ribbed effect on the outer face of the stocking at the widening portions thereof.

Having thus described my invention, I claim:—

1. In a knitting machine, the combination of straight rows of needles, mechanism for simultaneously knitting a plurality of courses of fabric for the end of the toe of a stocking and for a strengthening gore on sufficient of the needles for forming the foot of the stocking, mechanism for subsequently rendering idle all of said needles having the knitted courses thereon, except the needles for beginning the toe, and mechanism for operating said needles having the knitted courses thereon to knit successive increasing courses and joining said courses to the knitted gore for forming the toe of the stocking.

2. In a knitting machine, the combination of two needle beds, straight rows of needles in each bed, mechanism for knitting a plurality of courses of fabric for the end of the toe of a stocking and for a strengthening gore on the needles on one bed, mechanism for subsequently rendering idle all of the needles having the knitted fabric thereon on both said needle beds, except the needles for beginning the toe, and mechanism for subsequently knitting on both needle beds and widening the remainder of the toe of the stocking and joining said widening stitches to the strengthening gore.

3. In a knitting machine, the combination of two needle beds lying in planes intersecting each other, straight rows of needles in each bed, mechanism for beginning a course of fabric on both needle beds and knitting a plurality of courses of fabric on one needle bed only for the end of the toe of a stocking and for a strengthening gore on sufficient of the needles to form the foot of the stocking, mechanism for rendering all of said needles in both beds idle, except the needles for beginning the toe, and mechanism for operating all of the needles on both beds having knitted courses thereon for knitting the toe and widening the same and joining the widening stitches to said strengthening gore.

4. In a knitting machine, the combination with inclined needle beds, of rows of needles therein, mechanism for raising the needles in one bed, mechanism for raising the needles in the other bed, so that a thread may be laid into the hooks of all the raised needles and mechanism for using the needles on both beds for knitting the toe of a stocking.

5. In a knitting machine, the combination with inclined needle beds, of rows of needles therein, mechanism for raising the needles in one bed, mechanism for raising the needles in the other bed, so that a thread may be laid into the hooks of all the raised needles, means for rendering the needles on one bed idle and for knitting a plurality of courses on the other bed and mechanism for using the needles on both beds for knitting the toe of a stocking.

6. In a knitting machine, the combination with inclined needle beds, of rows of needles therein, mechanism for raising the needles in one bed, mechanism for raising the needles in the other bed, so that a thread may be laid into the hooks of all the raised needles, means for rendering the needles on one bed idle, and for knitting a plurality of courses on the other bed, and means for raising the bed on which the courses are knitted, so as to bring the knitting position of said needles close to the idle needles holding the first made stitches.

7. In a knitting machine, the combination with inclined needle beds, of rows of needles therein, mechanism for raising the needles in one bed, mechanism for raising the needles in the other bed, so that a thread may be laid into the hooks of all the raised needles, means for rendering the needles on one bed idle, and for knitting a plurality of courses on the other bed, means for raising the bed on which the courses are knitted, so as to bring the knitting position of said needles close to the idle needles holding the first made stitches, and means for subsequently knitting a toe of a stocking and uniting the outside stitches of the previously knitted portion with the united widening stitching of the toe.

8. The combination of inclined needle beds, rows of needles arranged therein, mechanism for laying a thread into the needles on both beds used in forming the foot of a stocking, mechanism for rendering idle the needles in one bed and for causing the needles in the other beds to knit a plurality of courses, mechanism for subsequently rendering idle all the needles carrying stitches, except the needles which form the narrow portion of the toe, and mechanism to throw in at periods one needle on the side of each bed for widening the toe.

9. In a knitting machine, the combination of rows of straight needles, means for causing said needles to knit a tube forming the leg of a stocking, and mechanism for fashioning the leg including means for knitting a strengthening gore and for subsequently uniting the outside stitches of the strengthening gore with the united widening stitches of the leg.

10. In a knitting machine, the combination of straight rows of needles, mechanism for causing said needles to knit a tube forming the leg of a stocking, mechanism for rendering said needles idle, and for raising all the needles used to widen the leg, whereby a thread may be laid into the hooks of the widening needles and a plurality of courses knitted on the widening needles on one bed, mechanism for subsequently rendering all the widening needles idle and for throwing into action the remainder of the knitting needles, and mechanism for throwing into action at periods certain of the widening needles.

11. A knitting machine including in combination, a straight row of needles, mechanism for raising simultaneously all the needles in said row, a stitch cam for depressing said needles, a latch opener, and means for raising the stitch cams whereby the needles are not depressed sufficiently to form stitches, so that said latch openers may raise the latches preparatory to the commencement of the toe of the stocking.

12. The combination of a straight row of needles, of means for simultaneously raising all of said needles, a stitch cam for depressing said needles, a stitch cam carriage, means for reciprocating said carriage, a sinker carriage, a thread carrier mounted on said sinker carriage, dogs carried by the opposite ends of the stitch cam carriage, and adapted to engage the sinker carriage, and means for releasing the dogs, whereby the throw of the stitch cam carriage exceeds that of the sinker carriage.

13. A knitting machine including in combination, a straight needle bed, needles carried thereby, individual jacks for each needle for lifting the same, a stitch cam for depressing successively said needles, and means for reciprocating said stitch cams and means for rendering the jacks ineffective to lift the needles.

14. In a knitting machine, the combination of a straight needle bed, needles carried thereby, individual jacks for each needle for raising the same, a stitch cam for depressing the needles, and means whereby the needle-operating jacks may be moved out of the path of the needles.

15. In a knitting machine, the combination of a straight needle bed, needles carried thereby having upper and lower butts, individual jacks for each needle, adapted to engage the lower butt, raise the needle, a stitch cam, coöperating with the upper butts for depressing the needles and means for reciprocating the jacks.

16. In a knitting machine, the combination of a straight needle bed, needles carried thereby having upper and lower butts, individual jacks for each needle, adapted to engage the lower butt and raise the needle, a stitch cam coöperating with the upper butts for depressing the needles, means for controlling the needle-raising jacks, whereby said jacks may be rendered ineffective and means for reciprocating the jacks.

17. In a knitting machine, the combination of two straight inclined needle beds, needles carried thereby, jacks for raising the needles, a stitch cam for depressing the needles, a cam wheel for raising the jacks first in one needle bed and then in the other needle bed and means for controlling the needle-raising jacks, whereby the jacks may be rendered ineffective.

18. In a knitting machine, the combination of two straight inclined needle beds, needles carried thereby, jacks for raising the needles, a stitch cam for depressing the needles, a cam wheel for raising the jacks first in one needle bed and then in the other needle bed, means for rendering said cam wheel idle and for raising the jacks in one needle bed only and means for controlling the needle-raising jacks, whereby the jacks may be rendered ineffective.

19. In a knitting machine, the combination of two straight inclined needle beds, needles carried thereby, jacks for raising said needles, stitch cams for depressing said needles, a cam wheel adapted to raise the jacks in one needle bed, an independent cam wheel for raising the jacks in the other needle bed, said cam wheels having double cam projections, whereby the needles are raised twice, first in one bed and subsequently twice in the other bed.

20. In a knitting machine, the combination of two straight inclined needle beds, needles carried thereby, jacks for raising the needles, cams for depressing the needles, a rock shaft for operating each set of jacks, a plurality of cam wheels for operating said rock shaft, and means for shifting said rock shafts, means for shifting said rock shafts are brought into operative engagement with various cam wheels, whereby the time of lifting the jacks may be varied.

21. In a knitting machine, the combination of two straight inclined needle beds, needles carried thereby, jacks for raising the needles, cams for depressing the needles, a rock shaft for operating each set of jacks, a plurality of cam wheels for operating said rock shafts, means for shifting said rock shafts longitudinally, whereby said rock shafts are brought into operative engagement with various cam wheels, whereby the time of lifting the jacks may be varied, and a change drum for controlling the longitudinal shifting of the rock shafts.

22. A knitting machine including in combination, two straight inclined needle beds, needles carried thereby, jacks for raising said needles, stitch cams for depressing said needles, a rock shaft operating to raise each set of jacks, cam wheels for operating said rock shaft, a change drum, means operated by said change drum for rendering said cam wheels idle, means operated by said change drum for lifting one of said needle beds to raise the hooks of the needles into threading position, and means for raising and lowering the jacks of the other needle bed, whereby a thread may be laid into the hooks of the needles on both beds, and the needles on one bed only subsequently operated to knit a plurality of courses.

23. In a knitting machine, the combination of two straight inclined needle beds, needles carried thereby, jacks for raising said needles, stitch cams for depressing said needles, means for controlling the jacks, whereby said jacks may be rendered effective or ineffective for raising the needles, means for raising said jacks, including cam wheels, means for controlling said cam wheels including a change drum, a pawl for operating said change drum, means for causing said change drum to remain idle, and a pattern chain for throwing into action said change drum.

24. A knitting machine including in combination, two straight needle beds, needles carried thereby, individual jacks for raising said needles, means for raising said jacks, means for rendering said jacks ineffective, including fashioning plates adapted to engage said jacks and to raise the same out of contact with the needles.

25. A knitting machine including in combination, two straight needle beds, needles carried thereby, individual jacks for raising said needles, means for raising said jacks, means for rendering said jacks ineffective, including a rotating shaft, a plurality of fashioning plates carried thereby and adapted to be successively brought into engagement with said jacks for lifting the same out of engagement with said needles.

26. A knitting machine including in combination, two straight needle beds, needles carried thereby, individual jacks for raising said needles, means for raising said jacks, means for rendering said jacks ineffective, including a plurality of fashioning plates arranged in longitudinal alinement, and means for moving said plates laterally across the jacks for throwing into or out of effective action a certain number of jacks.

27. A knitting machine including in combination, two straight needle beds, needles carried thereby, individual jacks for raising said needles, means for raising said jacks, means for rendering said jacks ineffective, including a rotatable shaft, a plurality of alined fashioning plates carried by said shaft, means for rotating said shaft to bring said fashioning plates into engagement with the jacks, and means for separating the alined fashioning plates.

28. A knitting machine including in combination, two straight needle beds, needles carried thereby, individual jacks for raising said needles, means for raising said jacks, means for rendering said jacks ineffective, including a rotatable shaft, a plurality of alined fashioning plates carried by said shaft, means for rotating said shaft to bring said fashioning plates into engagement with the jacks, means for separating the alined fashioning plates, said means including a shaft having oppositely wound worms, and pattern-controlled mechanism for rotating said worm shaft.

29. In a knitting machine, the combination of a needle bed, needles carried thereby, jacks for raising said needles, means for controlling said jacks, whereby the same are rendered ineffective including fashioning plates, means for moving said fashioning plates longitudinally including a worm shaft, independent ratchet rings and connecting devices for operating said worm shaft, means for rendering said ratchet rings idle, and means for throwing into action the proper ring for controlling the jacks for the different parts of the stocking.

30. In a knitting machine, the combination of a needle bed, needles carried thereby, jacks for raising said needles, means for controlling said jacks, whereby the same are rendered ineffective including fashioning plates, means for moving said fashioning plates longitudinally including a worm shaft, independent ratchet rings and connecting devices for operating said worm shaft, means for rendering said ratchet rings idle, means for throwing into action the proper ring for controlling the jacks for the different parts of the stocking, and a ratchet ring for returning said worm shaft to normal position.

31. A knitting machine including in combination, a straight needle bed, needles carried thereby, jacks for raising the needles, means for controlling said jacks, including fashioning plates, a worm shaft for moving said fashioning plates longitudinally, a ratchet ring and connecting devices for moving said worm shaft in one direction, and a ratchet ring and connecting devices for moving the worm shaft in the opposite direction, said ratchet rings operating during the formation of the heel of the stocking, and means for pawling one ratchet ring one tooth at a time, and the other ratchet ring two teeth at a time.

In testimony whereof, I have hereunto signed my name at Easton, Pennsylvania, this thirty first day of October 1910.

WILLIAM EVAN CHIPMAN.

Witnesses:
ERNEST ARTHUR PIGEON,
HUGH JAMES FLEMING,
JOHN BRUNNER.